May 22, 1928.

L. P. PEKRUL 1,670,519

GATE CONNECTION FOR CORRUGATED CULVERTS

Filed Dec. 31, 1924

INVENTOR.
L. P. PEKRUL
ATTORNEY.

Patented May 22, 1928.

1,670,519

UNITED STATES PATENT OFFICE.

LEO P. PEKRUL, OF DENVER, COLORADO.

GATE CONNECTION FOR CORRUGATED CULVERTS.

Application filed December 31, 1924. Serial No. 759,094.

My invention relates to flap gates or valves of the type employed to automatically control the flow of water through corrugated metal culverts and other conduits of irrigation and drainage systems, and its primary object is to provide a simple means for mounting the gate at either end of a conduit of the above stated character, resulting in a dependable rigid connection between the gate frame and the corrugated culvert, ready installation and replacement and economy of construction.

Figure 1:
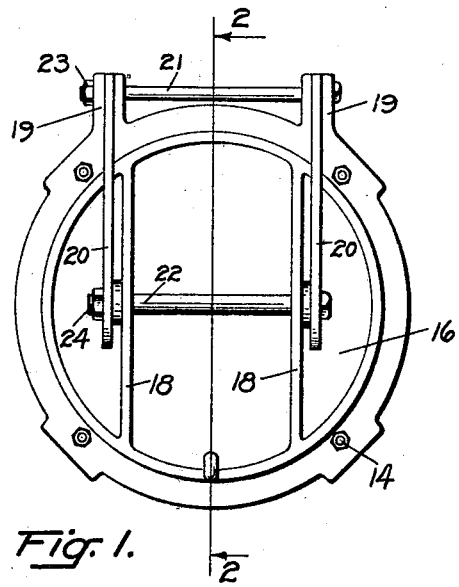
Figure 2:
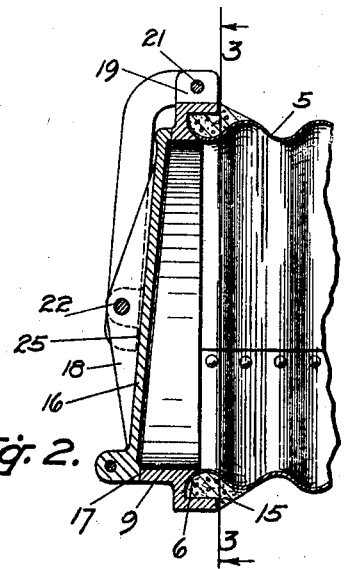
Figure 4:
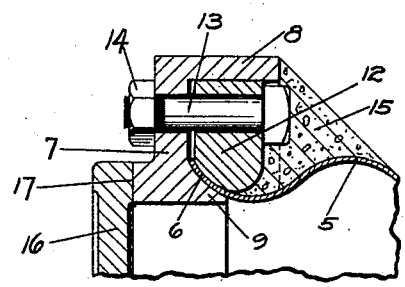
Figure 3:
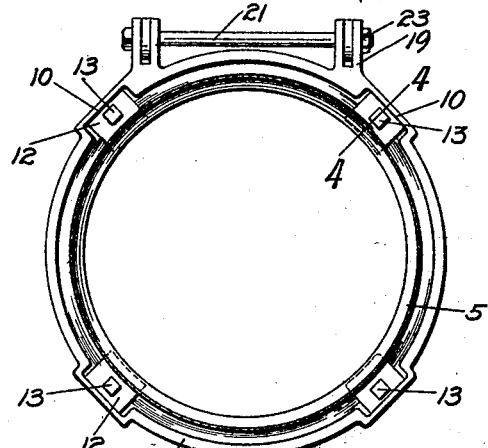

An embodiment of the invention has been illustrated in the accompanying drawings in the several views of which like parts are similarly designated and in which:

Figure 1 represents a face view of the gate at an end of a corrugated metal culvert;

Figure 2, a vertical section on the line 2—2, Figure 1;

Figure 3, a section taken on the line 3—3, Figure 2;

Figure 4, an enlarged fragmentary section on the line 4—4, Figure 3; and

Figure 5:
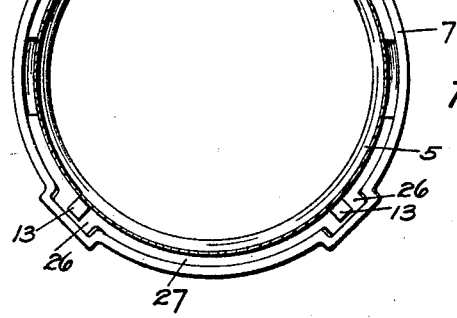

Figure 5, a sectional elevation similar to Figure 4 showing a modified construction.

Referring more specifically to the drawings, the numeral 5 designates a culvert made of corrugated sheet metal and having at or near its end an outwardly flaring flange 6 as a natural consequence of its transverse corrugation.

The flange or flared end is an essential element in securing the frame of the gate as will hereinafter be described and it is to be understood that while my invention is particularly adapted for use in connection with corrugated metal conduits, it can be applied to pipes of different form by providing an end thereof with an outwardly bent flange to co-operate with the clamping means included in the invention for securing the frame of the gate in place.

The frame above referred to comprises a flat ring 7 having at its outer circumference a laterally projecting annular rim 8 adapted to embrace the culvert, and provided at its inner circumference with an annular lip 9 extending in the same direction to engage the inner surface of the flange or flare at the end of the culvert.

The rim 8 is interiorly recessed as at 10 to receive a plurality of clamp-blocks 12 which by engagement with the outer surface of the flange, co-operate with the lip 9 to rigidly secure the frame in place on the culvert.

The blocks are beveled and shaped to correspond with the flare and diameter of the flange on the culvert and they are clampingly secured to the frame by bolts 13 fitted in alined holes of the blocks and the ring-portion of the frame, and nuts 14 screwed upon the protruding threaded ends of the bolts.

The space between the rim of the frame and the culvert is, after the blocks are in place, filled with cement as shown at 15 in Figures 2 and 4 of the drawings to further provide for the rigid connection of the frame with the culvert and to insure a leak-proof joint.

The circular gate 16 which normally engages an annular seat 17 on the outside of the frame has two parallel ribs 18 provided with alined apertures for their connection with the appliance by which the gate is pivotally mounted on the frame.

The frame is to this end provided with upstanding longitudinally slotted and transversely apertured ears 19 and the appliance above referred to consists of two links 20 which are pivotally attached to the frame and the gate by headed rods 21 and 22 passing through the holes of the ears and the ribs and therewith registering apertures in the ends of the links, the rods being secured against displacement by nuts 23 and 24 screwed upon their threaded extremities.

The upper ends of the links are bent laterally to enter the slots of the ears of the frame and their opposite ends are extended beyond their points of connection with the rod 22 on the gate, to provide stops which by engagement with the outer surface of the gate as at 25, limit its pivotal movement on the links.

In the modified construction illustrated in Figure 5, the clamp blocks 26 are integrally connected in pairs by segmental bars 27 which fit between the rim of the frame and the exterior surface of the culvert.

It will be apparent that both methods of clamping the frame upon the end of the culvert are well adapted to secure it rigidly against displacement while permitting of its being readily removed and replaced in case of wear or breakage.

The seat on the frame which slants from the perpendicular, supports the gate in its normal closed position and if by an outflow of water, it is opened by movement about the pivotal axis provided by the rod 21, it will retain its position relative to the links to fall back to its original position as soon as the flow of water has subsided, while the limited play afforded by its pivotal connection with the links assures of its even contact with the seat.

Having thus described my invention, what I claim and desire to secure by Letters Patent is:

1. The combination with a corrugated culvert, of a gate, a frame for the gate comprising a flat ring having at its outer circumference an integral, laterally projecting, annular rim, apertured clamp blocks fitted within the rim and engaging a corrugation of the culvert at one side thereof, and bolts in said apertures to clamp the blocks to the frame, the frame having an integral annular lip engaging the other side of the corrugation.

2. The combination of a corrugated culvert, a gate, a frame for the gate having a lip extending into the culvert and engaging a corrugation at one side thereof, clamping devices engaging the other side of the corrugation and cooperating with the lip to secure the frame on the culvert, and cement filler in which the clamping devices are embedded.

In testimony whereof I have affixed my signature.

LEO P. PEKRUL.